(12) United States Patent
Johnston et al.

(10) Patent No.: US 11,080,294 B1
(45) Date of Patent: Aug. 3, 2021

(54) SYSTEMS AND METHODS FOR DATA ANALYTICS

(71) Applicant: Adlumin, Inc., Washington, DC (US)

(72) Inventors: Robert Johnston, Bethesda, MD (US);
Daniel McQuade, Washington, DC (US); Mahkah Wu, Washington, DC (US)

(73) Assignee: Adlumin, Inc., Washington, DC (US)

( * ) Notice: Subject to any disclaimer, the term of this patent is extended or adjusted under 35 U.S.C. 154(b) by 0 days.

(21) Appl. No.: 17/166,122

(22) Filed: Feb. 3, 2021

(51) Int. Cl.
| | |
|---|---|
| *G06F 16/00* | (2019.01) |
| *G06F 16/25* | (2019.01) |
| *G06F 16/28* | (2019.01) |
| *G06F 40/284* | (2020.01) |
| *G06F 16/27* | (2019.01) |
| *G06F 40/30* | (2020.01) |
| *G06F 16/2457* | (2019.01) |

(52) U.S. Cl.
CPC ...... *G06F 16/254* (2019.01); *G06F 16/24573* (2019.01); *G06F 16/278* (2019.01); *G06F 16/284* (2019.01); *G06F 40/284* (2020.01); *G06F 40/30* (2020.01)

(58) Field of Classification Search
CPC ......... G06F 16/254; G06F 16/43; G06F 16/24
USPC ........................................ 707/602, 690, 758
See application file for complete search history.

(56) References Cited

U.S. PATENT DOCUMENTS

| | | | |
|---|---|---|---|
| 7,159,237 B2 | 1/2007 | Schneier et al. | |
| 7,650,638 B1 | 1/2010 | Njemanze et al. | |
| 8,069,230 B2 | 11/2011 | Lancaster et al. | |
| 8,090,733 B2 * | 1/2012 | Bayliss | G06F 16/24578 707/758 |
| 8,104,087 B2 | 1/2012 | Quinn et al. | |
| 8,291,258 B2 | 10/2012 | Narayanaswamy | |
| 8,438,163 B1 * | 5/2013 | Li | G06K 9/00536 707/737 |
| 9,021,583 B2 | 4/2015 | Wittenstein et al. | |
| 9,729,416 B1 | 8/2017 | Khanal et al. | |
| 9,813,432 B2 | 11/2017 | Dasgupta et al. | |
| 10,250,451 B1 * | 4/2019 | Moghe | H04L 41/14 707/707 |
| 2007/0127823 A1 * | 6/2007 | Seeber | G06F 16/5838 382/218 |
| 2007/0192400 A1 | 8/2007 | Lee et al. | |

(Continued)

*Primary Examiner* — Alexandria Y Bromell
(74) *Attorney, Agent, or Firm* — Barcelo, Harrison & Walker LLP

(57) ABSTRACT

A serverless data processing architecture may be a high-velocity, cost-efficient and massively scalable log ingest application and event parser that may act as the intermediary between data collection and data analysis and may handle the receipt and parsing of incoming event data generated by collector and sensor applications. The log analytics data science portion of an ingest process may determine if arbitrarily structured log data is anomalous and/or security relevant via single event or multievent algorithms. There are numerous applications for both the single and multi-event log analytics platforms. Any application involving reliably finding anomalous pieces of semi-structured or unstructured text data may provide potential use cases. These processes may be particularly widely applicable because these processes are agnostic to and require no prior knowledge of the structure of the data.

13 Claims, 7 Drawing Sheets

(56) References Cited

U.S. PATENT DOCUMENTS

| | | | |
|---|---|---|---|
| 2014/0016864 A1* | 1/2014 | Chattopadhyay | G06K 9/6202 |
| | | | 382/165 |
| 2015/0341376 A1 | 11/2015 | Nandy et al. | |
| 2018/0052907 A1 | 2/2018 | Greifeneder et al. | |
| 2019/0236155 A1* | 8/2019 | Bachrach | G06F 16/3329 |
| | | | 707/707 |

* cited by examiner

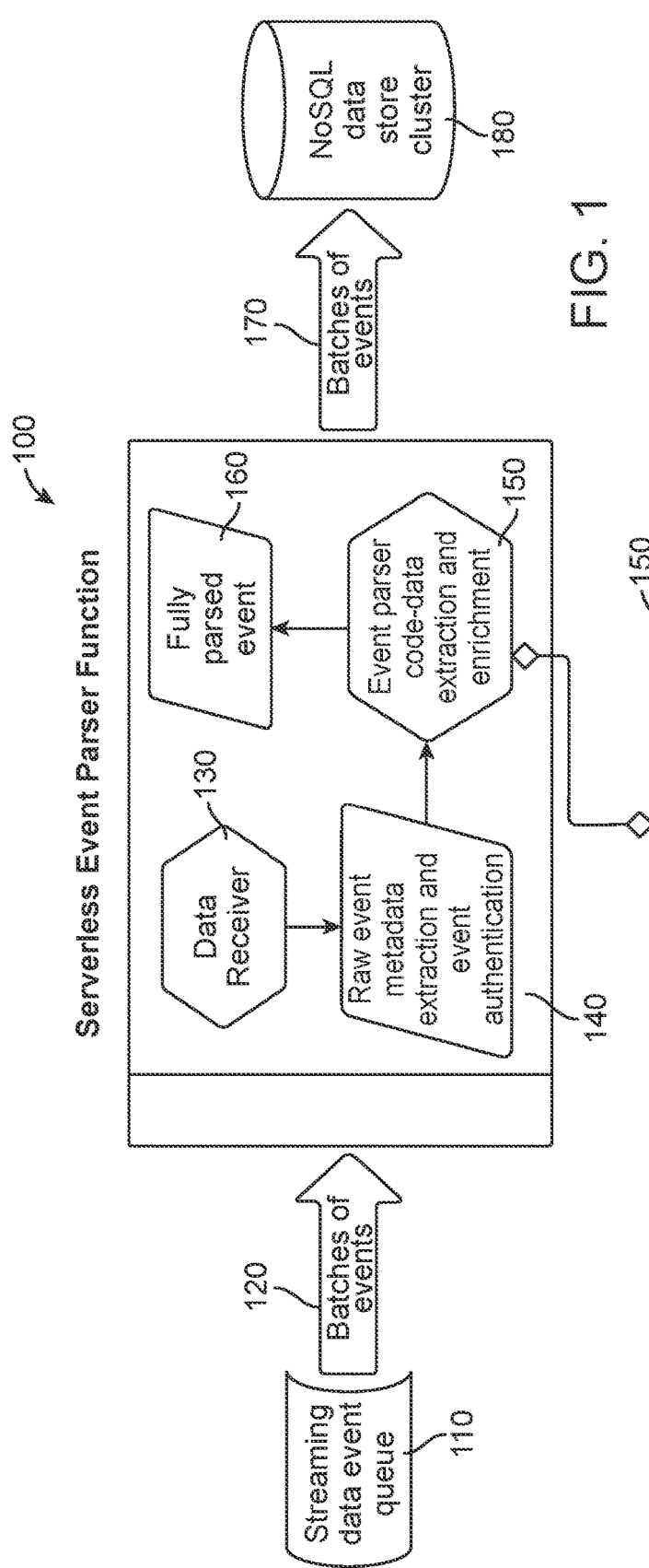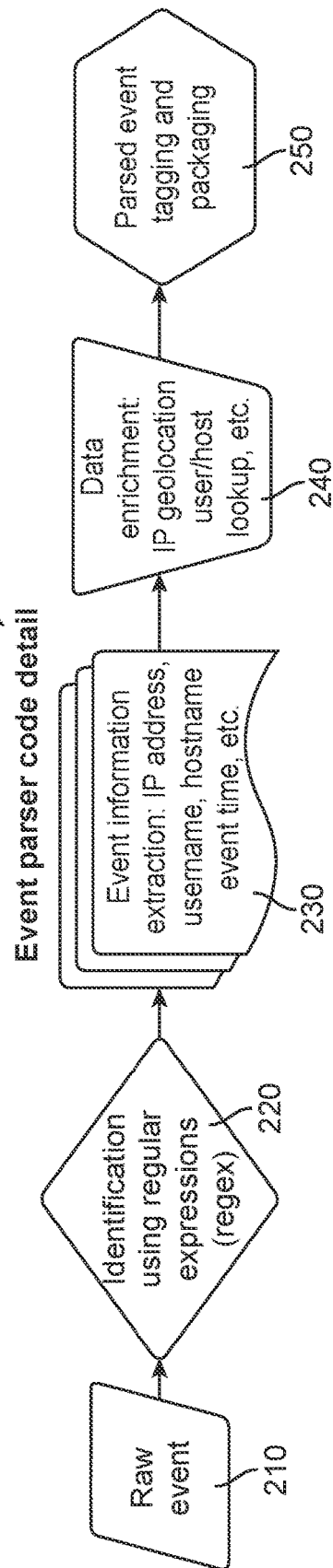

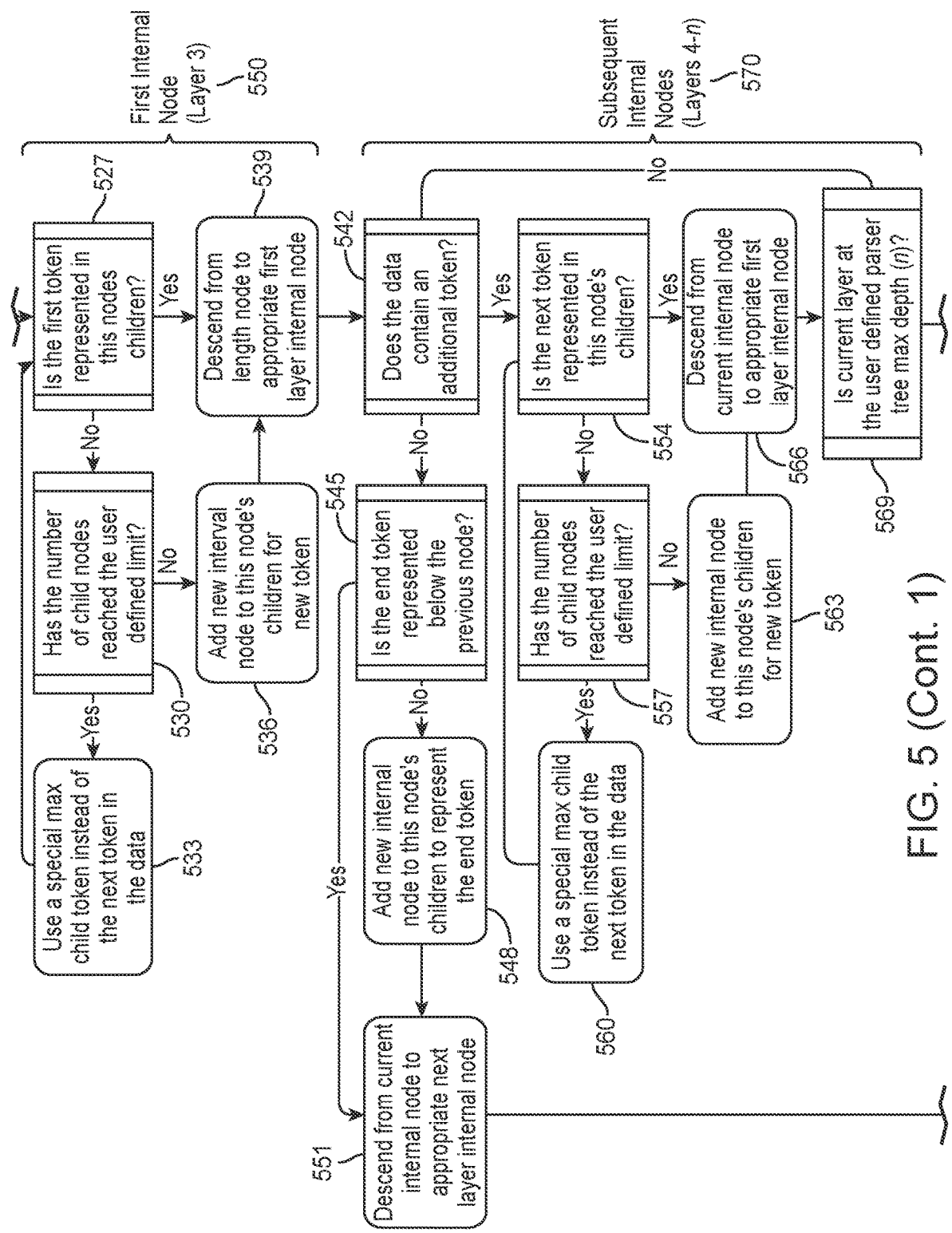
FIG. 5 (Cont. 1)

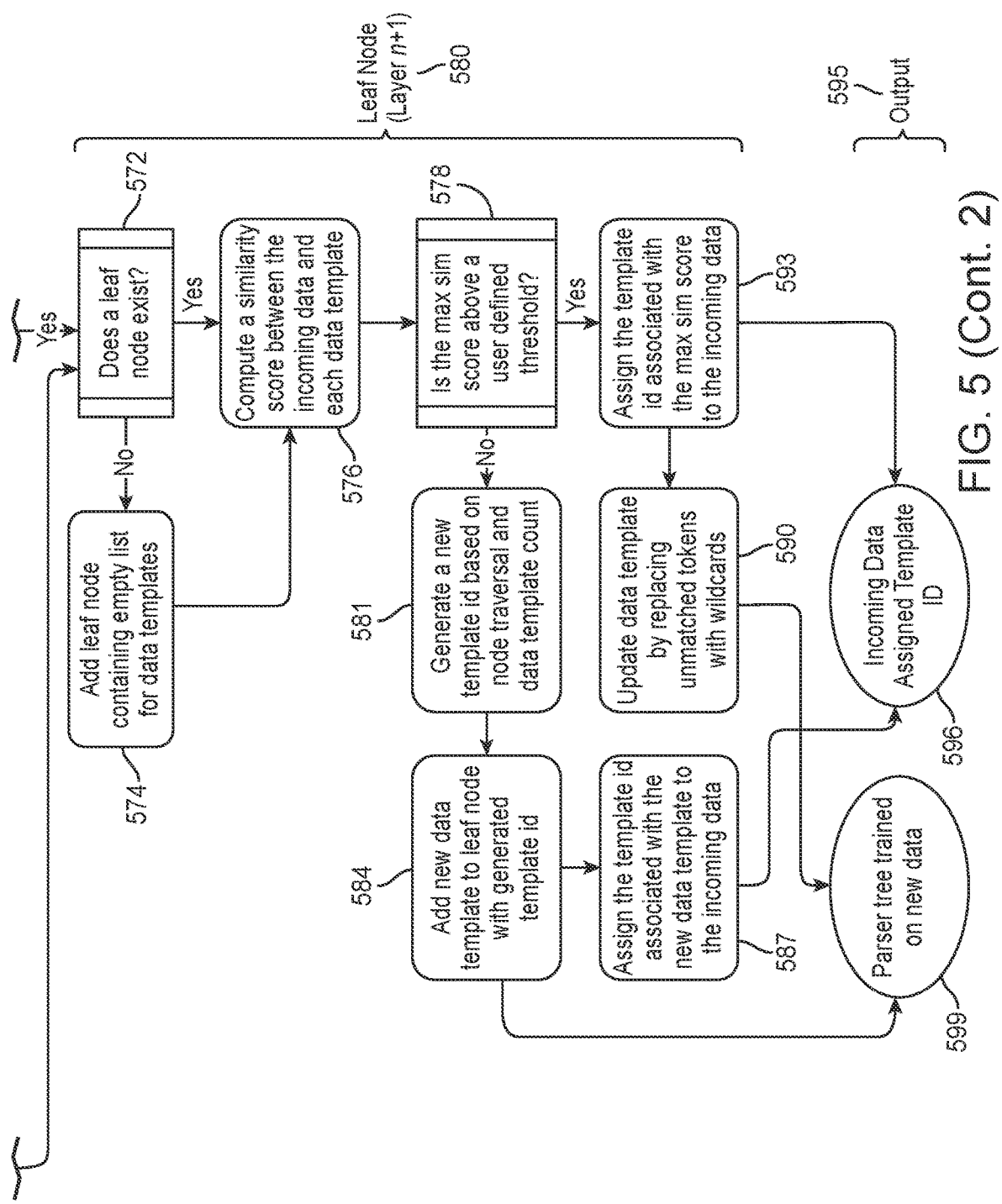
FIG. 5 (Cont. 2)

SYSTEMS AND METHODS FOR DATA ANALYTICS

I. TECHNICAL FIELD

The present disclosure relates to systems and methods for data analytics and more particularly to systems and methods for anomaly detection on core banking systems.

II. BACKGROUND OF THE INVENTION

There is a need for handling massive volumes of event log data at scale. Conventional log analytics products require logs to be structured and for that structure to be known. There is a need to address the foregoing deficiencies in the art to analyze data regardless of data structure and without predefined knowledge about the structure of the data and to determine if arbitrarily structured log data is anomalous and/or security relevant.

III. BRIEF DESCRIPTION OF THE DRAWINGS

FIG. 1 depicts serverless event parser functions in accordance with certain embodiments.

FIG. 2 depicts event parser code detail in accordance with certain embodiments.

IV. DETAILED DESCRIPTION

Figure 3:
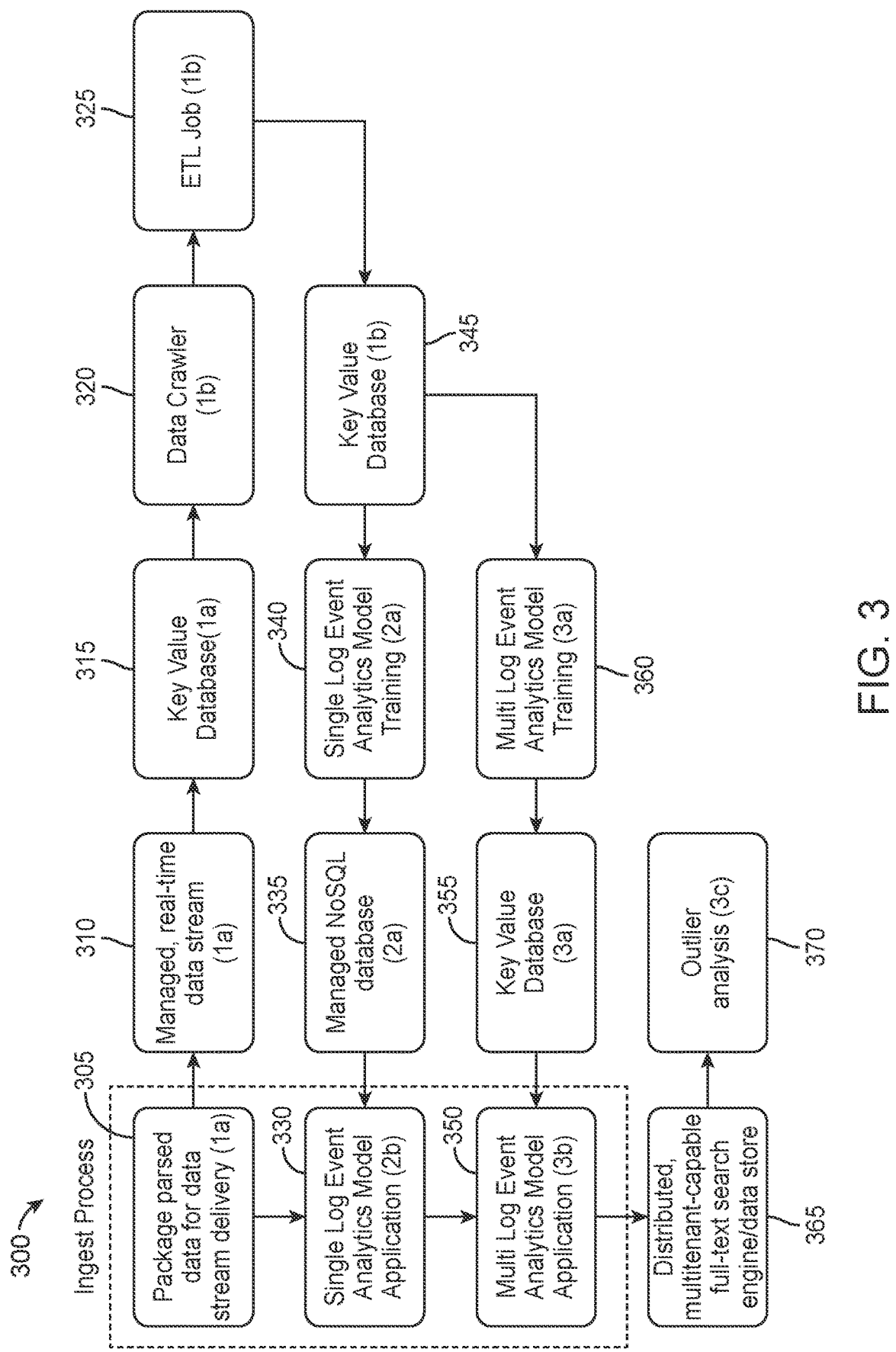
FIG. 3 depicts a data analytics system and method in accordance with certain embodiments.

In certain embodiments, a data analytics platform is disclosed, comprising: a data receiver for receiving event data and authenticating one or more events by extracting metadata and one or more validation tokens and comparing the one or more validation tokens against a list of authorized tokens and identifying one or more authenticated events if the one or more validation tokens to identify one or more events in the event data; a serverless data parser for extracting key data from the one or more authenticated events using serverless functions, constructing an object for each of the one or more authenticated events and batching similar objects of the one or more events into one or more batches; a distributed NoSQL data store cluster for storing the one or more batches of objects to facilitate rapid searches of the one or more batches of objects; and a data lake for parallel storage of the one or more batches of objects and to facilitate rapid access to large volumes of data comprising the one or more batches of objects that are packaged together, compressed and delivered to a real-time data stream.

In certain embodiments, a data analytics method is disclosed, comprising: receiving one or more incoming logs; retrieving a set of log templates wherein each log template comprises a rarity score; for each of the incoming logs: matching the incoming log to one of the log templates; and assigning the log rarity score of the matched log template to the incoming log. Each log template may further comprise: a regular expression pattern that matches text data that corresponds to the log template; and a set of the non-variable tokens contained in the log template; and the step of matching the incoming log to one of the log templates may be based on: matching the incoming log to one of the log template regular expression text patterns; or if the incoming log does not match any of the regular expression text patterns associated with any of the log templates, determining which of the sets of non-variable tokens associated with the log templates is most similar to the set of non-variable tokens in the incoming log. The data analytics method may further comprise: ingesting event data from a plurality of sensors; forwarding the event data to a data lake to facilitate rapid access to large volumes of event data; packaging the event data together into one or more data objects based on one or more partition fields, compressing the data objects, and accumulating the data in a real-time data stream until a preset volume of data has accumulated or a preset time has elapsed; and forwarding the data objects to a key value database where the data objects are partitioned according to metadata fields. The data analytics method may further comprise: data crawling the one or more data objects stored in the key value database and updating a schema of the one or more data objects, the schema comprising information about the data contents of the one or more data objects and how they are partitioned; performing an extract, transform and load (ETL) process on the one or more data objects using a managed serverless platform, the ETL process comprising: extracting the data object; transforming the data object into a tabular format such that each row of the data object corresponds to a single record; and compressing and writing the data object to the key value database. The step of compressing and writing the data object may comprise: writing the data object based on one or more pre-defined metadata fields; and updating the schema of the one or more data objects if any new partition combinations result from the ETL process.

The log templates may be constructed by: retrieving training data; using a log parsing method to produce one or more log templates based on the training data; creating for each of the one or more log templates a regular expression pattern matching the log template; creating for each of the one or more log templates a set of one or more associated search tokens; and determining a rarity score for each of the one or more log templates. The training data may be retrieved from the data lake using a serverless querying tool, and the data may be organized into separate datasets based on a predefined set of partition fields. The ranty score may be determined based at least in part on the proportion of logs in the training dataset associated with the log template. The log rarity score may be determined either by: a function of the log template's rarity score if the incoming log is matched to a log template using a regular expression pattern match; or a function of the log template's rarity score and a quantification of the similarity between the incoming log's set of non-variable tokens and the log template's set of non-variable tokens if the incoming log is matched to a log template using non-variable token similarity.

The rarity score may be determined according to the following equation:

$$r = c_1(1-j_{max}) + c_2(s_{it})$$

where r is the rarity score, $c_1$ is a pre-defined constant, $j_{max}$ is the Jaccard similarity between the matched log template's search tokens and the log's tokens, $c_2$ is a pre-defined constant, and $s_{it}$ is the score associated with the matched template.

The data analytics method may further comprise: determining if each incoming log is an anomalous log by determining if the rarity score of the incoming log is greater than a score threshold. The score threshold may be determined by: retrieving scoring data; matching each log in the scoring dataset to one of the log templates based on: whether each log matches one or more regular expression text patterns of the log template; or if each log does not match any of the regular expression text patterns of the log template, based on the similarity between one or more non-variable tokens of the log and one or more search tokens of the log template; calculating a rarity score for each log; calculating a score threshold based on a percentile score and a standard deviation score of the rarity scores for each log.

The score threshold may be determined according to the following equation:

$$t=c_1(p)+c_2(s)$$

where t is the score threshold, $c_1$ is a first pre-defined constant (that may for example and without limitation be 1), p is the percentile score, $c_2$ is a second pre-defined constant (that may for example and without limitation be 1), and s is the standard deviation score.

The data analytics method may further comprise: checking the contents of each anomalous log against a set of keywords of interest and a set of excluded keywords; and designating a positive detection for each anomalous log that contains a keyword of interest and does not contain an excluded keyword. The data analytics method may further comprise preprocessing incoming logs by: defining a set of regular expression patterns; designating a special token for each of the regular expression patterns; and replacing each regular expression pattern with the corresponding designated special token.

In certain embodiments, a data analytics method is disclosed, comprising: receiving an incoming log; retrieving an existing parser tree or initializing a new parser tree: and determining if the incoming log matches an existing log cluster in the parser tree, and if so, assigning the template id associated with the existing log cluster to the incoming log, or if not, generating a new log cluster and updating the parser tree with the new log cluster. The data analytics method may further comprise: ingesting event data from a plurality of sensors; forwarding the event data to a data lake to facilitate rapid access to large volumes of event data; packaging the event data together into data objects based on one or more partition fields, compressing the data objects, and accumulating the data in a real-time data stream until a preset volume of data has accumulated or a preset time has elapsed: and forwarding the data objects to a key value database where the data objects are partitioned according to metadata fields. The data analytics method may further comprise: data crawling the one or more data objects stored in the key value database and updating a schema of the one or more data objects, the schema comprising information about the data contents of the one or more data objects and how they are partitioned: performing an extract, transform and load (ETL) process on the one or more data objects using a managed serverless platform, the ETL process comprising: extracting the data object; transforming the data object into a tabular format such that each row of the data object corresponds to a single record; and compressing and writing the data object to the key value database. The step of compressing and writing the data object may comprise: writing the data partitioned based on one or more predefined metadata fields; updating the schema of the one or more data objects if any new partition combinations result from the ETL process. The step of determining if the incoming log matches an existing log cluster in the parser tree comprises: preprocessing incoming logs; tokenizing the incoming log based on a set of predefined delimiters; attempting to traverse from the root node of the parser tree to the first layer of the tree based on the number of tokens in the incoming log: using the incoming log's tokens in a predefined order to descend the parser tree until the bottom of the parser tree is reached or the incoming log contains no more tokens; and determining if any of the log clusters associated with the node reached by descending the parser tree are sufficiently similar to the incoming log's tokens to constitute a match. The data analytics method may further comprise preprocessing incoming logs by defining a set of regular expression patterns; designating a special token for each of the regular expression patterns; and replacing each regular expression pattern with the corresponding designated special token. The step of generating a new log cluster may comprise generating a template id for that log cluster by hashing a representation of the log cluster's location in the parser tree. The parser tree may have a variable depth and logs that have fewer tokens than the maximum depth of the parser tree may be organized into log templates located at a depth corresponding to their final token. The variable depth may vary from 3 to n+2 layers of nodes where n is a predefined parameter. If a log contains fewer than n tokens, then a special end of log token may be added to the end of the parser tree and the end of log token may be a leaf node and may be associated with a list of log templates.

As shown in FIG. 1, in certain embodiments, a serverless data processing architecture may be a high-velocity, cost-efficient and massively scalable log ingest application and event parser. The architecture may act as the intermediary between data collection and data analysis portions of a data analytics platform. The serverless application architecture may handle the receipt and parsing of incoming event data generated by the collector and sensor applications. The architecture may be responsible for the secure receipt of event data (which may utilize TLS encryption over HTTP), insertion into a streaming data event queue 110, validation, parsing and processing of the data by containerized serverless functions 100, and persistence of the processed events into a distributed, NoSQL data store cluster 180.

The architecture may include application code and supporting cloud infrastructure that may be custom tailored to meet a specific use-case. In certain embodiments, the architecture may include a streaming data event queue 110, serverless data parser functions 100, and a distributed NoSQL data store cluster 180.

In a steaming data event queue 110, raw event logs received by the collector and sensor applications may be inserted into multiple cloud-based streaming data event queues 110. The streaming event queues 110 may be massively scalable, and each queue may be capable of capturing gigabytes of data per second. Events transmitted to the queues may be encrypted using Transport Layer Security (TLS). The queues may serve as a central repository for collecting raw log data before it is processed by the serverless function code.

In certain embodiments, the serverless data parser functions may consist of several dozen event-driven code blocks, each of which may be built to parse relevant data points from specific event log formats. Compute resources for the functions may be dynamically allocated as the functions are invoked, and each function may execute in a containerized environment. As events are inserted into the streaming data queue 110, the parser functions 100 may be automatically triggered. The functions may extract batches of events 120 from the queue 110. The size of the batches 120 may be pre-defined on a per-queue basis. Each function may be massively scalable and multiple instances of a single function may be invoked in parallel to efficiently process events as they are inserted into the streaming event queue.

In certain embodiments, each serverless function 100 consists of several key components, which may include without limitation a data receiver 130 for decoding and authentication, an event parser 150 for extracting pertinent event data, event insertion for persisting processed events, and a distributed NoSQL data store cluster 180. The data receiver 130 may be the entry point of the serverless function 100. Incoming events 120 may be decompressed, at which point their metadata 140 may be extracted. In certain embodiments, valid events all contain an authentication token; this token may be extracted from the event metadata 140 and compared against a list of authorized tokens. If the event does not contain an authentication token or if the token fails to validate, the authentication failure may be logged, and the event may be discarded. In certain embodiments, tokenizing may be a term from Natural Language Processing as would be understood by those of skill in the art as described for example and without limitation at the following link: https://nlp.stanford.edu/IR-book/html/htmledition/tokenization-1.html.

As shown in FIG. 2, in certain embodiments, authenticated events may be sent through the event parser 150. The parser 150 automatically start with raw event 210 may determine the type of event that has been received, and may identify the event using regular expressions (regex) 220. The parser 150 may proceed to extract all relevant information 230 from the event. The data may be enriched 240 via IP geolocation, user/host lookup and/or other relevant information. There may be dozens of potential data points 230 that may be extracted from a given event during steps 230 and 240, including source and destination IP address, event time and user account information. The parsed event may then be tagged and packaged 250 to create a fully parsed event 160. Batches of fully parsed events 170 may be forwarded to the NoSQL data store cluster for storage.

For event insertion of persisting processed events, a JSON object containing the processed event may be constructed. The JSON object may be batched together with other processed events that are similar in nature, and the batch may be inserted into a distributed NoSQL data store cluster. Processed events 160 may be batched into batches of events 170 and inserted into a distributed NoSQL data store cluster 180. The cluster may be highly scalable and may consist of multiple nodes. Nodes may be automatically added and removed depending on the amount of data being processed. A variety of different nodes may work together to form the cluster. Master nodes may be in charge of cluster-wide management and configuration actions such as adding and removing nodes. Data nodes may store data and may execute data-related operations such as search and aggregation. Client nodes may forward cluster requests to the master node and data-related requests to data nodes. Ingest nodes may be used for pre-processing documents before indexing.

The serverless data processing architecture may be the intermediary between the data collection and data analysis portions of a data analytics platform. The serverless data processing architecture 100 may be used to securely receive incoming event and log data and insert it into a streaming data queue 110, verify the validity of the data, parse and process the data using serverless functions 100, and persist the processed events 170 to storage 180.

The potential use cases for the serverless data processing architecture are numerous. The highly scalable and cost-efficient nature of the serverless data processing architecture make it ideal for handling massive volumes of event log data at scale.

In certain embodiments as shown in FIG. 3, the log analytics data science portion of an ingest process 300 may determine if arbitrarily structured log data is anomalous and/or security relevant. The application may be cloud-based and may utilize an auto-scaling server infrastructure in order to maximize performance and cost efficiency. This software may be custom-tailored to address specific needs and use cases. In particular, most log analytics products require logs to be structured and for that structure to be known while certain embodiments of the present invention can handle any log data. In contrast, certain embodiments are agnostic to the data structure and require no pre-defined knowledge about the structure of the data.

In certain embodiments, data may be branched into a separate data lake that facilitates rapid access to a large volume of data during the ingest process 300. In order to minimize cost, data may be packaged together 305, compressed, and delivered to a managed, real-time data stream 310 where it may accumulate. Once a preset volume of data has accumulated (e.g., 128 MBs) or a preset time limit has been reached (e.g., 15 minutes), the data may be bundled together and delivered to a key value database 315 where it may be partitioned according to the time that it was received.

In certain embodiments, an extraction, transformation, load (ETL) process 325 may be initiated on a regular, pre-defined time interval (e.g., hour). Upon initiation, a data crawler 320 may explore the data stored in the key value database 315 and may update a schema of the data which may contain information on the data contents and the way that it is partitioned. Once the crawler 320 completes, it may trigger the ETL job 325. This job may be executed using a managed serverless ETL platform and may output data to Key Value Database 345. The ETL job may include the following steps. The job may utilize the schema updated by the data crawler to load new data into a data object based on Apache Spark's DataFrame object. In certain embodiments where the data is packaged together and compressed as described above, the data object may contain up to thousands of records per row. The job may begin by decompressing and unpackaging the data (also termed 'exploding' the data object), such that each row of the data object may contain a unique record and each column of the data object may correspond to a specific data field. The job may determine the appropriate data type of each column. The job may remove any columns containing only null values. The job may compress and write the data object to a key value database in a columnar format (e.g., parquet format), partitioning based on pre-defined metadata fields (e.g., date). The job updates a schema of the transformed data with any new partition combinations.

In certain embodiments, a single log event analytics algorithm may include a model training process 340 and a model application process. Model training (2a) 340 may be cloud based and may be deployed on an event-driven, serverless computing platform. The process may begin by retrieving training data from the data lake using a serverless querying tool to retrieve recent data. If data exceeds a pre-defined limit (e.g., 100,000 datapoints), data may be randomly sampled. If data is sampled, an independent random variable may be used for each datapoint to yield a number of datapoints that approximately equals the datapoint limit. The data may be organized into separate datasets based on a pre-defined set of data fields (e.g., client, data stream type, device id), so called "groupby fields". The rest of the model training process 340 may be conducted separately for each unique combination of these groupby fields' values.

Figure 4:
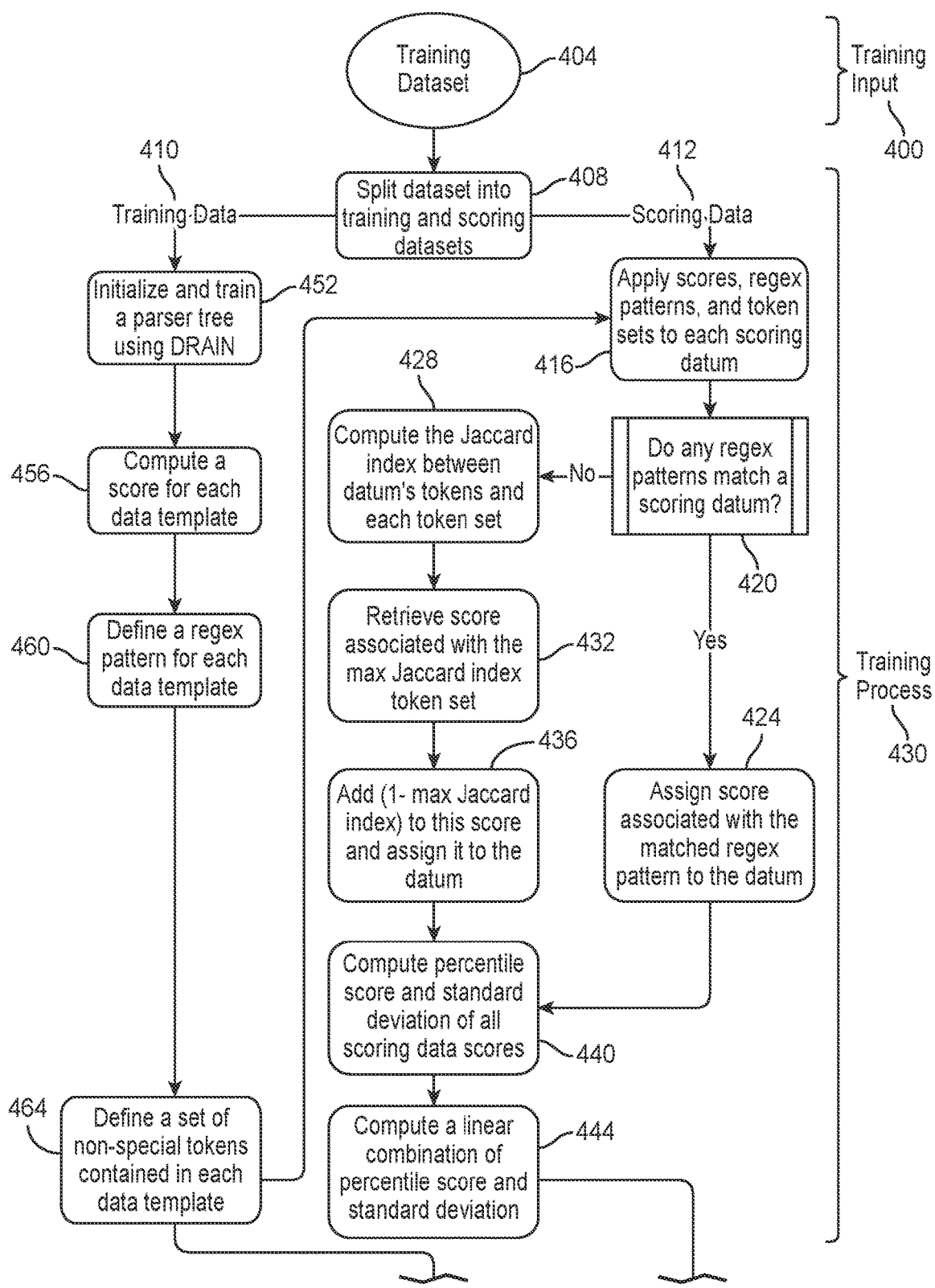
FIG. 4 depicts a single event algorithm in accordance with certain embodiments.
Figure 4:
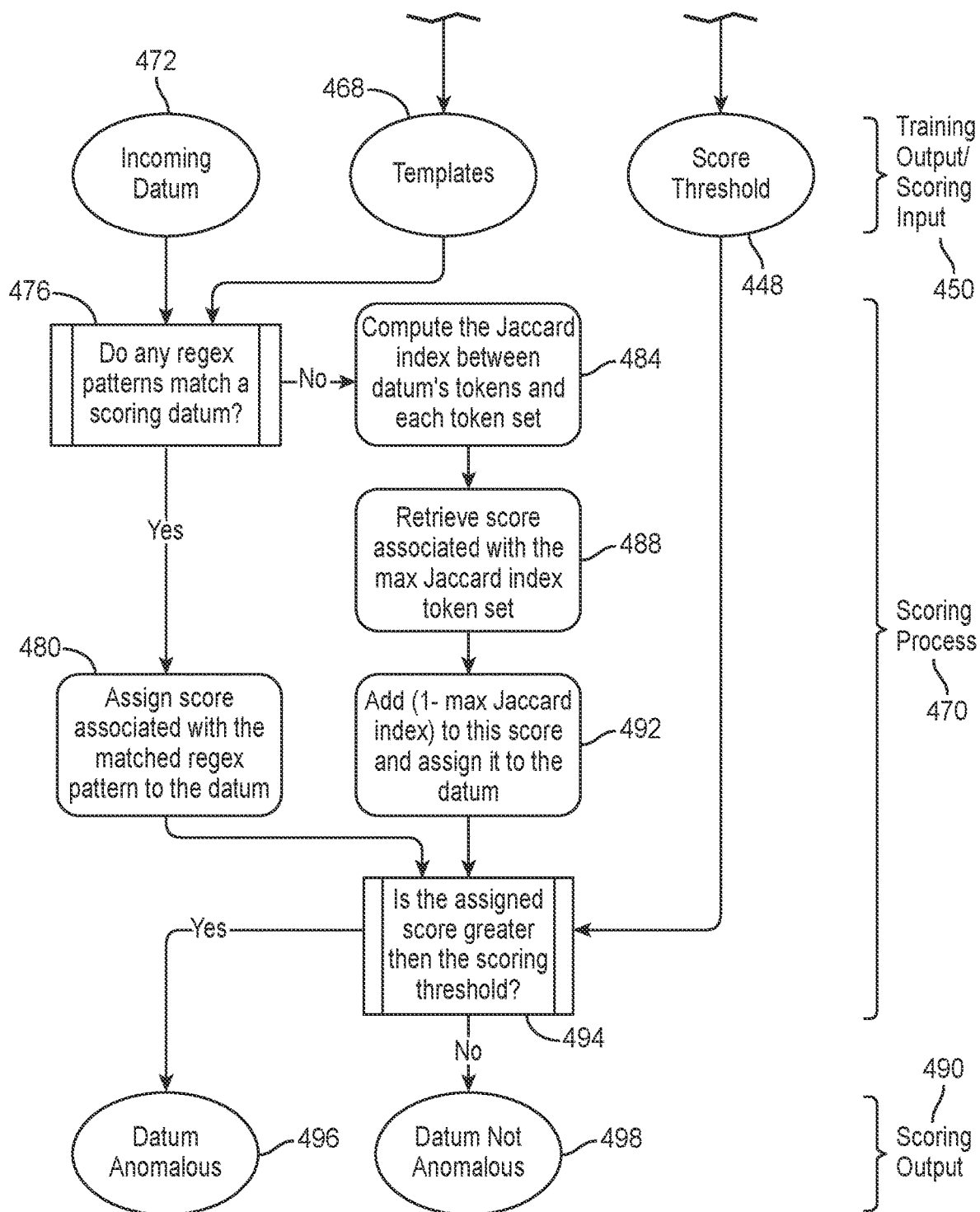
Figure 5:
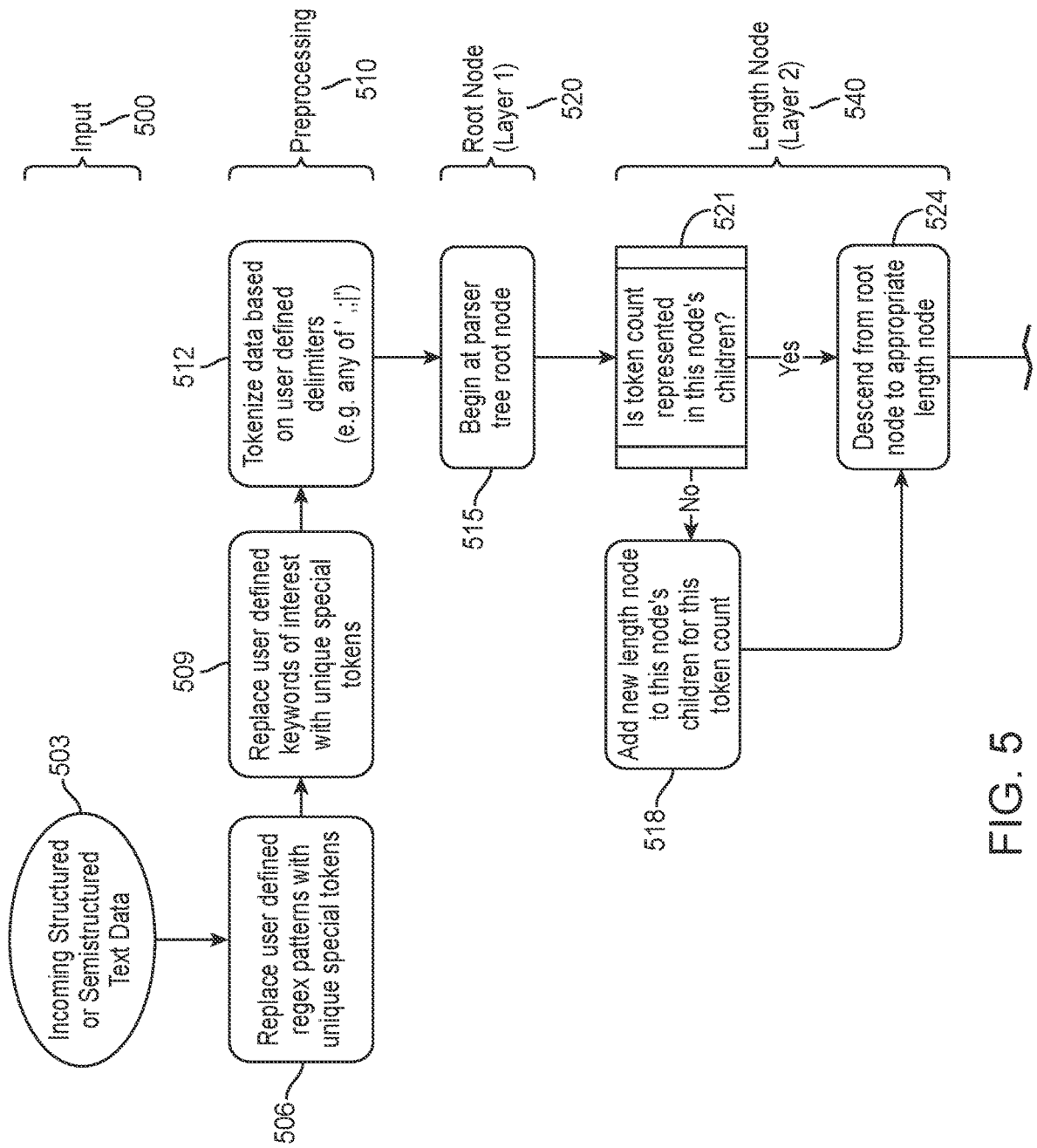
FIG. 5 depicts a multi-event algorithm in accordance with certain embodiments.

In certain embodiments as shown in FIG. 4, training input 400 may include training dataset 404 that may be divided 408 into training data 410 and scoring data 412 based on a pre-defined ratio, for example and without limitation the ration of 75% of data for training data 410 and 25% of data for scoring data 412 may be used.

In certain embodiments, training process 430 may be conducted as described in detail below. The log field of the training dataset 404 may be preprocessed and used to train a fixed depth parser tree 452. This parser tree may produce a set of log templates and may associate each log in the training dataset with one of these templates. Data may be compiled for each log template, which in certain embodiments may include: a set of non-variable tokens associated with the log template 464, so called "search tokens"; a regular expression text pattern representation of the log format associated with the log template 460; a rarity score 456 based on the proportion of logs in the training dataset associated with the log template; and a sample log associated with the log template. In certain embodiments, particularly rare templates may be filtered out of the set of log templates based on pre-defined limits (e.g., exclude log templates if fewer than 5 logs are associated with them and/or if fewer than 0.001% of all training logs are associated with them).

Next, a score threshold 448 may be computed. Each log in the scoring dataset 412 may be matched to a particular log template contained in the set of log templates. Scores, regex patterns and token sets may be applied to each scoring datum 416. Logs may be matched 420 using the regular expression text pattern of each log template. If a regex pattern matches a log, the score associated with the matched regex pattern may be assigned 424 to the log. If a log does not match any of regular expression text patterns, then the non-variable tokens of the log may be compared to the search tokens of the log template 428. The log template with the highest Jaccard similarity (also called Jaccard index) between its search tokens and the log's tokens may be considered a match 432. Short logs with fewer than a pre-defined number of tokens (e.g., 5 tokens) may not be considered.

Once a log has been matched to a log template, a rarity score may be computed in step 432, 436 and 440 for that particular log. If the log template was matched via a regular expression template, then the rarity score may be simply the score 424 associated with the matched log template multiplied by a pre-defined constant (that may for example and without limitation be 1). If the log is matched to a log template based on the search tokens, then the rarity score may be the linear combination of 1 minus the Jaccard similarity between the matched log template's search tokens and the log's tokens 436 and the score associated with the matched template 432, as in equation 1.

$$r = c_1(1 - j_{max}) + c_2(s_{it}) \quad (1)$$

where r is the rarity score, $c_1$ is a first pre-defined constant (that may for example and without limitation be 1), $j_{max}$ is the Jaccard similarity between the matched log template's search tokens and the log's tokens, $c_2$ is a second pre-defined constant (that may for example and without limitation be 1), and $s_{it}$ is the score associated with the matched template.

In certain embodiments, after a rarity score has been computed for all scoring logs, the 99.99th percentile value of all rarity scores may be computed, so called the "percentile score". In addition, the standard deviation of the rarity scores may be computed, so called the "standard deviation score". Using these values, a score threshold may be computed as the linear combination of percentile score and the standard deviation score 444, as in equation 2.

$$t = c_1(p) + c_2(s) \quad (2)$$

where t is the score threshold 448, $c_1$ is a first pre-defined constant (that may for example and without limitation be 1), p is the percentile score, $c_2$ is a second pre-defined constant (that may for example and without limitation be 1), and s is the standard deviation score.

In certain embodiments, following computation, the values of the groupby fields, the set of log templates, the score threshold, and metadata about the training session may be stored in a managed NoSQL database 335. If the cardinality of the set of log templates may be larger than a pre-defined threshold 448 (e.g., 300), the set of log templates 468 may be compressed prior to database delivery.

In certain embodiments, model application (2b) 330 may proceed as described below. During the ingest process, the values of the groupby fields of each incoming log may be determined. Using these field values, the process retrieves the appropriate set of log templates and score threshold from the managed NoSQL database 335 that they are stored in.

In certain embodiments, the training output/coring input 450 may include the training output of templates 468 and score threshold and incoming datum 472. In certain embodiments, in scoring process 470 a rarity score may be assigned to each template. In certain embodiments, incoming datum 472 may be compared to regex patterns of templates 468 to determine if any regex patterns match a scoring datum 476. If so, the score associated with the matched regex pattern may be assigned to the datum 480. If not, the Jaccard index between the datum's tokens and each token set 484 may be computed. The score associated with the max Jaccard index token set 488 may be retrieved. The score to be assigned to the datum 472 then may be determined by adding (1−max Jaccard index) to the retrieved score and assigning 492 the result to incoming datum 492.

In certain embodiments, in scoring output 49, if the rarity score is greater than the score threshold 494, then the log may be considered anomalous 496. If not, the log may be considered not to be anomalous 498.

In certain embodiments, if a log is considered anomalous, its contents may be compared against a set of keywords of interests and a set of excluded keywords. If the log contains a keyword of interest and does not contain an excluded keyword, then the log may be considered to be a positive detection. All other logs may be considered negative detections.

In certain embodiments, multi log event analytics may include model training process (3a) 360. Model training may be cloud based and may be deployed on an event-driven, serverless computing platform. The process may begin by retrieving training data from the data lake using a serverless querying tool to retrieve recent data. Input 500 may include incoming semi-structured or unstructured text data 503. If data 503 exceeds a pre-defined limit (e.g., 100.000 datapoints), data 503 may be randomly sampled. If data is sampled, an independent random variable may be used for each datapoint to yield a number of datapoints that approximately equals the datapoint limit. The data 503 may be organized into separate datasets based on a pre-defined set of data fields (e.g., client, data stream type, device id), so called "groupby fields". The rest of the model training process (3a) 360 may be conducted separately for each unique combination of these groupby fields' values.

If a parser tree for the given unique combination of groupby fields' values has not already been initialized, then an empty parser tree may be initialized. Otherwise, the existing parser tree may be loaded from a key value database 345 and decompressed.

The log field of the dataset may be preprocessed and used to train a parser tree. A type of parser tree was proposed by He, Zhu, Zheng, and Lyu in *Drain: An Online Log Parsing Approach with Fixed Depth Tree* (ICWS 2017). A parser tree may be adapted from that proposed by He et al. in an implementation produced by LogPAI (see https://github.com/logpai/logparser), as in the single event version described. However, several differences from the LogPAI implementation may be included. The parser tree may no longer be fixed depth. Instead, logs that have fewer tokens than the depth of the tree may be organized into log templates located at the depth corresponding to their final token. Preprocessing may be more complex. Rather than making a generic replacement for all known parameters, a specific parameter token may be generated for each regular expression pattern. In addition, a specific keyword of interest token may be generated and used to replace instances of these keywords in order to better parse logs of interest. The tree structure may be implemented such that the nodes and log clusters that make up the parser tree may be attributes of the larger log parser object. Log clusters may be given a unique id based on a hash of their location in the tree. Several additional methods may be used to facilitate tree traversal, import/export, and debugging. Once the parser tree has been trained on all training data, it may be serialized, compressed, and written to a key value database (3a) 355.

In certain embodiments, multi log event analytics may include model application (3b) 350. During the ingest process, the values of the groupby fields of each incoming log may be determined. Using these field values, the process may retrieve the appropriate parser tree from a key value database 355 and decompress it.

The incoming log may be used to train this parser tree. If the incoming log matches an existing log cluster in the parser tree, then the log may be assigned the template id associated with that log cluster. If the log does not match an existing log cluster, then a new log cluster may be generated during this training process, and the parser tree may be serialized, compressed, and rewritten to a key value database. New log events may be rare, so new log clusters may be reliably generated in the same location in the parser tree. Because log cluster ids may be a hashed version of this location, their generation may be largely deterministic, meaning this process may be able to handle new log events arriving in parallel. The log may then be assigned the id of the new log cluster. Log ids may be appended to the parsed document and inserted into the database containing parsed log data 365.

In certain embodiments, outlier analysis (3c) 370 may be performed. Outlier analysis may be cloud based and may be deployed on an event-driven, serverless computing platform. This process may initiate on a pre-defined time interval (for example and without limitation 1 hour). This process may begin by retrieving data from the distributed, multitenant-capable full-text search engine/data store 365 that the ingest process loads data into. The process may retrieve all data or may optionally only retrieve records that contain pre-defined keywords of interest or that do not contain pre-defined exclusion keywords. The process may load data from a pre-defined time span (e.g., 2 weeks).

The data may be organized by time and the log cluster id assigned in part 3b such that the number of occurrences of a particular log cluster id within pre-defined time buckets (e.g., 10 minutes) spanning the entire time span may be known. This may yield a separate discrete time series for each log cluster id. The rest of the outlier process may be conducted for each of these time series.

The process may estimate a typical distribution of the data. It may do so by computing a kernel density estimate of the data's distribution using the entire dataset. This estimate may be subtracted from the actual distribution, yielding an adjusted distribution.

In certain embodiments, the process may identify peaks (otherwise known as local maxima) in the portion of the adjusted distribution that correspond to the time within the time interval on which the process is initiated. Peaks that do not exceed a minimum prominence may be excluded. The minimum prominence may be set to the maximum of a pre-defined absolute minimum (e.g., 3), a pre-defined constant (e.g., 0.5) multiplied by the maximum number of logs observed in any time bucket, or a pre-defined constant (e.g., 1.2) multiplied by the median number of logs observed in each time bucket.

Peaks with prominence exceeding the minimum threshold may be considered anomalous, and the logs associated with these peaks are considered positive detections. All other logs may be considered negative detections.

This model application (3b) algorithm 350 was designed for log data, but it has application for any structured or semi structured text data 503 as input 500. A log may be used below to describe any of this kind of data.

The parser tree may be composed of a root node 520, then a layer of nodes based on the number of tokens contained in a log, then a series of layers of nodes based on the length on the first n tokens of the log. Each node for the nth token may be termed a leaf node and may be associated with a list of log templates. Nodes that are neither the root node, length nodes, nor leaf nodes may be termed internal nodes. If a layer of internal nodes contains more nodes then a pre-defined limit, then a special wildcard node may be added to which all unmatched tokens are appended. Otherwise, the wildcard node may function like any other internal node.

In certain embodiments, if a log contains fewer than n tokens, then a special end of log token may be added to the tree. This end of log token may also be a leaf node and may be similarly associated with a list of log templates. Thus, the parser tree may not be of fixed depth, potentially varying in depth from 3 to n+2 layers of nodes.

In certain embodiments, the training process may begin by preprocessing 510 logs. A pre-defined set of regular expression patterns may be defined by the user. Special tokens may also be designated for each of these patterns. During preprocessing, all instances of the regular expression pattern may be replaced 506 with the associated special token. Utilizing a distinct special token for each regular expression pattern may enable this algorithm to differentiate logs that begin with several parameters, an application that He et al state DRAIN was not designed to tackle but that is common in certain applications. In addition, a set of keywords of interest may be defined and similarly replaced 509 with a distinct special token. This may significantly improve the algorithm's ability to find anomalous logs by enabling a user to impart domain knowledge to the algorithm. In certain embodiments, data may be tokenized based on user defined delimiters 512, for example and without limitation any of ",; |".

Following preprocessing the model application (3b) 350 may begin at parser tree root node 515. In certain embodiments, the process may proceed to Length Node (Layer 2) 540, wherein the process may determine if the token count of root node 520 is represented in the children of the root node 521. If so, the process may descend from the root node to an appropriate length node 524. If not, a new length node 540 made be added to the children of the root node for the token count 518 before descending from the root node to an appropriate length node 524.

In certain embodiments, the process may proceed to a first internal node (Layer 3) 550 portion of model application (3b) 350, wherein it may be determined if the first token is represented in the children of the current node 527. If so, the process may descend from the root node to an appropriate first layer internal node 539. If not, it may be determined if the number of child nodes has reached a user defined limit 530. If the user defined limit has been reached, a special max child token may be used instead of the next token in the data 533 and the process may return to step 527. If the user defined limit has not been reached, a new internal node may be added to the children of the current node for new token 536 before descending from the root node to an appropriate first layer internal node 539.

In certain embodiments, the process may proceed to subsequent internal nodes (layers 4–n) 570, wherein it may be determined if the data contains an additional token 542. If the data does not contain an additional token 542, it may be determined whether the end token is represented below the previous node 545. If the end token is not represented below the previous node, a new internal node may be added to the children of the current node to represent the end token 548. This step may be skipped if the end token is represented below the previous node. The process may then proceed to a step of descending from the current node to an appropriate next layer internal node 551. The process may then proceed to leaf node (Layer n+1) 580 by determining whether a leaf node exists 572.

If the data contains an additional token 542, it may be determined whether the next token is represented in the children of the current node 554. If the next token is not represented in the children of the current node 554, it may be determined whether the number of child nodes has reached a user defined limit 557. If the user defined limit has been reached, a special max child token may be used instead of the next token in the data 560 and the process may return to step 554. If the user defined limit has not been reached, a new internal node may be added to the children of the current node for new token 563 before descending from the root node to an appropriate next layer internal node 566. If the next token is represented in the children of the current node at step 554, the process may proceed directly to descending from the root node to an appropriate next layer internal node 566. The process may then determine if the current layer is at the user defined parser tree max depth (n) 569. If the max depth has not been reached, the process may return to step 542 and perform an additional iteration of subsequent internal nodes (layers 4–n) 570. If the max depth has been reached, the process may proceed to leaf node (layer n+1) 580 by determining whether a leaf node exists 572.

If a leaf node does not exist, a leaf node containing an empty list for data templates may be added 574. A similarity score may then be computed between the incoming data and each data template 576. Similarity may be quantified based on an edit distance approach (how many edits are necessary to transform one string into another), a token-based approach (how many tokens are shared between each string), or a sequence-based approach (measuring how long shared sequences are between the two strings). In certain embodiments, a token-based approach (Jaccard similarity) may be used.

If a leaf node exists at step 572, step 574 may be skipped and the process may proceed directly to step 576. In either case, it may then be determined whether the max similarity score is above a user defined threshold 578. If the max similarity score is not above the user defined threshold, a new template ID may be generated based on node traversal and data template count 581. New data may then be added to the leaf node with the newly generated template ID 584. The newly generated template ID may be assigned to the incoming data 587.

If the max similarity score is above the user defined threshold, template ID with the max similarity score may be assigned to the incoming data 593. The data template may be updated by replacing unmatched tokens with wildcards 590.

In certain embodiments, the process may proceed to output 595, wherein the output from steps 584 and 590 may be used to train the parser tree on new data 599. The output of steps 587 and 593 may proceed to assigning a template ID to incoming data 596. The existing parser tree thus may be updated to be aware of the new data that it has seen from input 500.

In certain embodiments, the parser tree may generate an id for any new log template that is generated. This log id may be based on a hash of the log template's location in the parser tree. This may be important for enabling parallel execution of this process because log templates may nearly always have the same location in the parser tree. As a result, if multiple separate processes both simultaneously receive the same new log, all processes may add the log template to their respective versions of the parser tree and may generate the same id, without any communication among the processes.

The model application (3b) 350 may be designed to run on an auto-scaling, multi-node fleet of Linux-based virtual servers. Servers running the application may be automatically added or removed by an application load balancer in order to meet the volume of incoming data and maximize cost efficiency.

Both the single and multi-event log analytics platforms may be used to find log data of interest from among the billions of benign or uninteresting logs that may be ingested. The data lake pipeline may be infrastructure supporting these modeling efforts.

There are numerous applications for both the single and multi-event log analytics platforms. Any application involving reliably finding anomalous pieces of semi-structured or unstructured text data may provide a potential use case. These processes may be particularly widely applicable because these processes are agnostic to and require no prior knowledge of the structure of the data.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A data analytics method, comprising:
   receiving one or more incoming logs;
   retrieving a set of log templates wherein each log template comprises a rarity score;

for each of the incoming logs:
   matching the incoming log to one of the log templates; and
   assigning the log rarity score of the matched log template to the incoming log
determining if each incoming log is an anomalous log by determining if the rarity score of the incoming log is greater than a score threshold;
checking the contents of each anomalous log against a set of keywords of interest and a set of excluded keywords; and
designating a positive detection for each anomalous log that contains a keyword of interest and does not contain an excluded keyword.

2. The data analytics method of claim 1, wherein:
each log template further comprises:
   a regular expression pattern that matches text data that corresponds to the log template; and
   a set of the non-variable tokens contained in the log template; and
the step of matching the incoming log to one of the log templates is based on:
   matching the incoming log to one of the log template regular expression text patterns; or
   if the incoming log does not match any of the regular expression text patterns associated with any of the log templates, determining which of the sets of non-variable tokens associated with the log templates is most similar to the set of non-variable tokens in the incoming log.

3. The data analytics method of claim 1, further comprising:
ingesting event data from a plurality of sensors;
forwarding the event data to a data lake to facilitate rapid access to large volumes of event data;
packaging the event data together into one or more data objects based on one or more partition fields, compressing the data objects, and accumulating the data in a real-time data stream until a preset volume of data has accumulated or a preset time has elapsed; and
forwarding the data objects to a key value database where the data objects are partitioned according to metadata fields.

4. The data analytics method of claim 3, further comprising:
data crawling the one or more data objects stored in the key value database and updating a schema of the one or more data objects, the schema comprising information about the data contents of the one or more data objects and how they are partitioned;
performing an extract, transform and load (ETL) process on the one or more data objects using a managed serverless platform, the ETL process comprising:
   extracting the data object;
   transforming the data object into a tabular format such that each row of the data object corresponds to a single record; and
   compressing and writing the data object to the key value database.

5. The data analytics method of claim 4, wherein the step of compressing and writing the data object comprises:
writing the data object based on one or more pre-defined metadata fields; and
updating the schema of the one or more data objects if any new partition combinations result from the ETL process.

6. The data analytics method of claim 4, further comprising preprocessing incoming logs by:
defining a set of regular expression patterns;
designating a special token for each of the regular expression patterns; and
replacing each regular expression pattern with the corresponding designated special token.

7. The data analytics method of claim 1, wherein the log templates are constructed by:
retrieving training data;
using a log parsing method to produce one or more log templates based on the training data;
creating for each of the one or more log templates a regular expression pattern matching the log template;
creating for each of the one or more log templates a set of one or more associated search tokens; and
determining a rarity score for each of the one or more log templates.

8. The data analytics method of claim 7, wherein the training data is retrieved from the data lake using a serverless querying tool, and wherein the data is organized into separate datasets based on a predefined set of partition fields.

9. The data analytics method of claim 7, wherein the rarity score is determined based at least in part on the proportion of logs in the training dataset associated with the log template.

10. The data analytics method of claim 1, wherein the log rarity score is determined either by:
a function of the log template's rarity score if the incoming log is matched to a log template using a regular expression pattern match; or
a function of the log template's rarity score and a quantification of the similarity between the incoming log's set of non-variable tokens and the log template's set of non-variable tokens if the incoming log is matched to a log template using non-variable token similarity.

11. The data analytics method of claim 1, wherein the score threshold is determined by:
retrieving scoring data;
matching each log in the scoring dataset to one of the log templates based on:
   whether each log matches one or more regular expression text patterns of the log template; or
   if each log does not match any of the regular expression text patterns of the log template, based on the similarity between one or more non-variable tokens of the log and one or more search tokens of the log template;
calculating a rarity score for each log;
calculating a score threshold based on a percentile score and a standard deviation score of the rarity scores for each log.

12. A data analytics method, comprising:
receiving one or more incoming logs;
retrieving a set of log templates wherein each log template comprises a rarity score;
for each of the incoming logs:
   matching the incoming log to one of the log templates; and
   assigning the log rarity score of the matched log template to the incoming log
wherein the rarity score is determined according to the following equation:

$$r = c_1(1 - j_{max}) + c_2(s_{it})$$

where r is the rarity score, $c_1$ is a first pre-defined constant, $j_{max}$ is the Jaccard similarity between the matched log template's search tokens and the log's tokens, $c_2$ is a second pre-defined constant, and $s_{lt}$ is the score associated with the matched template.

13. A data analytics method, comprising:

receiving one or more incoming logs;

retrieving a set of log templates wherein each log template comprises a rarity score;

for each of the incoming logs:
  matching the incoming log to one of the log templates; and
  assigning the log rarity score of the matched log template to the incoming log; and determining if each incoming log is an anomalous log by determining if the rarity score of the incoming log is greater than a score threshold;

wherein the score threshold is determined according to the following equation:

$$t = c_1(p) + c_2(s)$$

where t is the score threshold, $c_1$ is a first pre-defined constant, p is the percentile score, $c_2$ is a second pre-defined constant, and s is the standard deviation score.

* * * * *